(12) United States Patent
Fang et al.

(10) Patent No.: US 11,568,197 B2
(45) Date of Patent: Jan. 31, 2023

(54) METHOD, SYSTEM, AND APPARATUS FOR GENERATING AND TRAINING A DIGITAL SIGNAL PROCESSOR FOR EVALUATING GRAPH DATA

(71) Applicant: Optum Services (Ireland) Limited, Dublin (IE)

(72) Inventors: Dong Fang, Dublin (IE); Peter Cogan, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 1193 days.

(21) Appl. No.: 16/052,936

(22) Filed: Aug. 2, 2018

(65) Prior Publication Data

US 2020/0042857 A1    Feb. 6, 2020

(51) Int. Cl.
*G06N 3/04*     (2006.01)
*G06N 3/08*     (2006.01)
*G06F 16/901*   (2019.01)

(52) U.S. Cl.
CPC .......... *G06N 3/04* (2013.01); *G06F 16/9024* (2019.01); *G06N 3/08* (2013.01)

(58) Field of Classification Search
CPC ......... G06N 3/04; G06N 3/08; G06F 16/9024
See application file for complete search history.

(56) References Cited

U.S. PATENT DOCUMENTS

| | | | |
|---|---|---|---|
| 2004/0158569 A1* | 8/2004 | Evans | G06F 16/337 |
| 2017/0213381 A1 | 7/2017 | Bronstein et al. | |
| 2018/0165603 A1* | 6/2018 | Van Seijen | G06N 3/084 |

OTHER PUBLICATIONS

Deep neural networks on graph signals for brain imaging analysis. 2017 IEEE International Conference on Image Processing (ICIP). IEEE, 2017 (Year: 2017).*
Price et al. "Fusion of evolution constructed features for computer vision." May 2018 (Year: 2018).*
Du et al. "Topology adaptive graph convolutional networks." arXiv preprint arXiv: 1710.10370, 2017 (Year: 2017).*
Liu et al. "Random Walk Graph Laplacian-Based Smoothness Prior for Soft Decoding of JPEG Images" 2017 (Year: 2017).*
Tran, D., et al., "Learning Spatiotemporal Features with 3D Convolutional Networks", Oct. 7, 2015, In Proc. ICCV, 16 pages, https://arxiv.org/pdf/1412.0767.pdf, Jan. 4, 2019.

(Continued)

*Primary Examiner* — Li B. Zhen
*Assistant Examiner* — Moriam Mosunmola Godo
(74) *Attorney, Agent, or Firm* — Alston & Bird LLP

(57) ABSTRACT

Embodiments of the present disclosure provide methods, systems, apparatuses, and computer program products for generating, training, and utilizing a digital signal processor (DSP) to evaluate graph data that may include irregular grid graph data. An example DSP that may be generated, trained, and used may include a set of hidden layers, wherein each hidden layer of the set of hidden layers comprises a set of heterogeneous kernels (HKs), and wherein each HK of the set of HKs includes a corresponding set of filters selected from the constructed set of filters and associated with one or more initial Laplacian operators and corresponding initial filter parameters.

17 Claims, 9 Drawing Sheets

(56) References Cited

OTHER PUBLICATIONS

Perozzi, B., et al., "Deepwalk: Online Learning of Social Representations", Aug. 23, 2014, In Proceedings of the 20th ACM SIGKDD International Conference on Knowledge Discovery and Data Mining, 38 pages, http://perozzi.net/projects/deepwalk/, Jan. 4, 2019.

Li, R., et al., "Adaptive Graph Convolutional Neural Networks", Jan. 10, 2018, The Thirty-Second AAAI Conference on Artificial Intelligence (AAAI-18), 8 pages.

Li, C. et al., "DeepGraph: Graph Structure Predicts Network Growth", Oct. 20, 2016, Social and Information Networks (cs.SI); Learning (cs.LG), 9 pages.

Levie, R., et al., "CayleyNets: Graph Convolutional Neural Networks with Complex Rational Spectral Filters", May 22, 2017, Learning (cs.LG), 12 pages.

Lecun, Y., et al., "Gradient-Based Learning Applied to Document Recognition", Nov. 1, 1998, Proceedings of the IEEE 86 (11), 46 pages, http://yann.lecun.com/exdb/publis/pdf/lecun-98.pdf, Jan. 4, 2019.

Krizhevsky, A., et al., "ImageNet Classification with Deep Convolutional Neural Networks", Dec. 1, 2012, In NIPS, 9 pages, https://papers.nips.cc/paper/4824-imagenet-classification-with-deep-convolutional-neural-networks.pdf, Jan. 4, 2019.

Kipf, T., et al., "Semi-Supervised Classification with Graph Convolutional Networks", Feb. 22, 2017, In proceeding of International Conference on Learning Representations (ICLR), 14 pages, https://arxiv.org/pdf/1609.02907.pdf, Jan. 4, 2019.

Kipf, T., et al., "Deep Learning on Graphs with Graph Convolutional Networks", Mar. 22, 2017, BDL Workshop at NIPS 2016, 52 pages, http://deeploria.gforge.inria.fr/thomasTalk.pdf, Jan. 4, 2019.

Grover, A., et al., "node2vec: Scalable Feature Learning for Networks", Jul. 3, 2016, In Proceedings of the 22nd ACM SIGKDD International Conference on Knowledge Discovery and Data Mining, 10 pages, https://arxiv.org/pdf/1607.00653.pdf, Jan. 4, 2019.

Edwards, M., et al., "Graph Based Convolutional Neural Network", Sep. 1, 2016, Computer Vision and Pattern Recognition (cs.CV), 11 pages.

Du, Jian and Zhang, Shanghang, et al., "Topology Adaptive Graph Convolutional Networks", Feb. 11, 2018, Machine Learning (stat. ML), 13 pages.

Defferrard, M., et al., "Convolutional Neural Networks on Graphs with Fast Localized Spectral Filtering", Feb. 5, 2017, In proceeding of Advances in neural information inference systems (NIPS), 9 pages, https://arxiv.org/pdf/1606.09375.pdf, Jan. 4, 2019.

Bruna, J., et al., "Spectral Networks and Deep Locally Connected Networks on Graphs", May 21, 2014, Computer Vision and Pattern Recognition (cs.CV); Neural and Evolutionary Computing (cs.NE), 14 pages.

\* cited by examiner

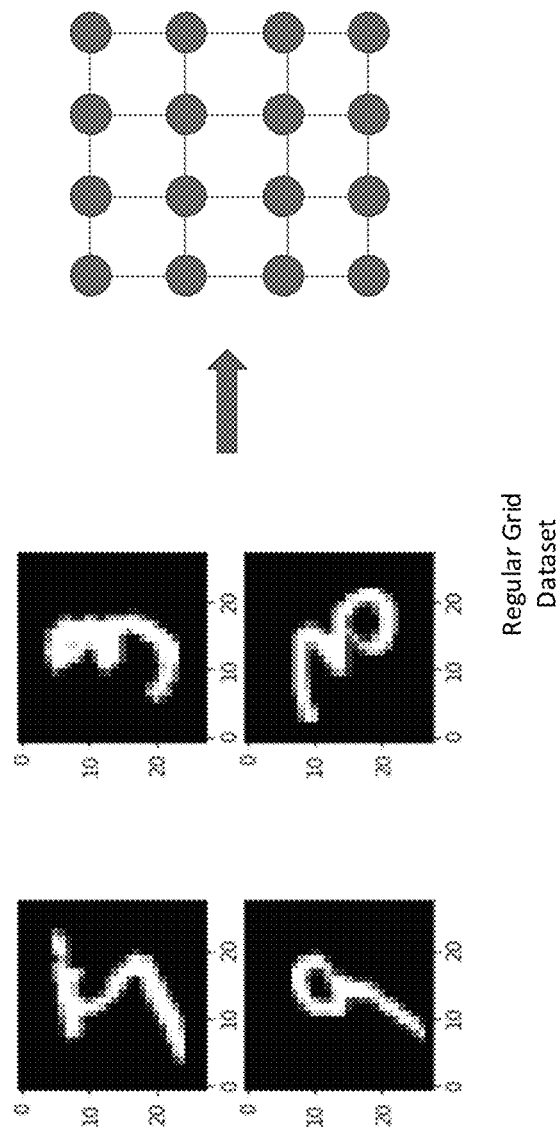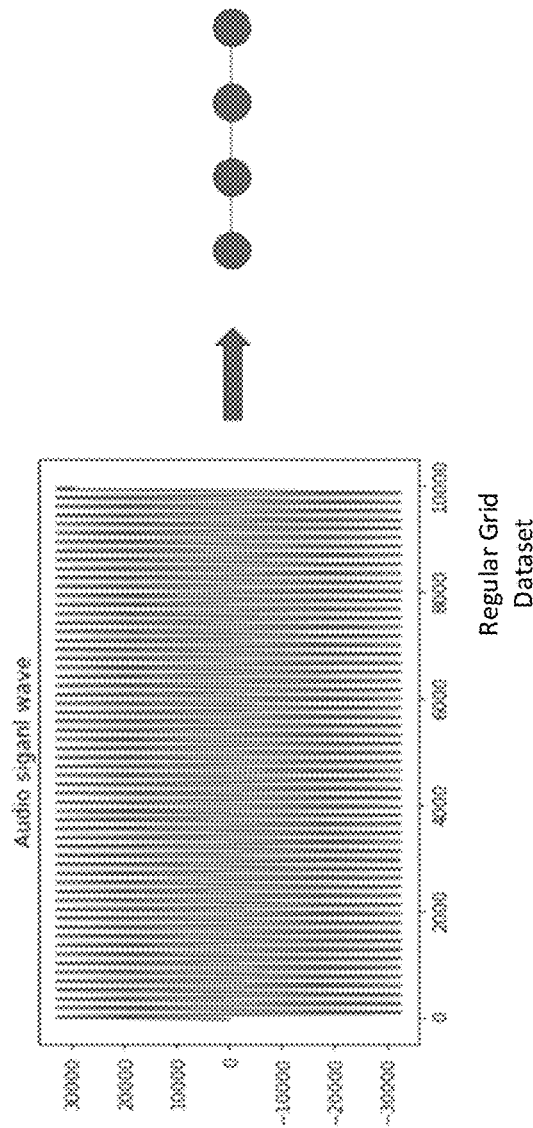
FIG. 4A
FIG. 4B

Irregular Grid Dataset (or Irregular Graph Dataset)

METHOD, SYSTEM, AND APPARATUS FOR GENERATING AND TRAINING A DIGITAL SIGNAL PROCESSOR FOR EVALUATING GRAPH DATA

TECHNOLOGICAL FIELD

Embodiments of the present invention generally relate to generating and training a digital signal processor (DSP) for the evaluation of graph data.

BACKGROUND

Various tools have historically been used to model grid datasets. Applicant has identified a number of deficiencies and problems associated with these tools. Through applied effort, ingenuity, and innovation, many of these identified problems have been solved by developing solutions that are included in embodiments of the present disclosure, many examples of which are described in detail herein.

SUMMARY

Although various tools have historically been used to model grid data sets, some problems may only be modeled by irregular grids, for which a traditional CNN model is not be able to provide accurate predictive results. Embodiments described herein set forth DSP machine learning models for use with graph data, including graph data comprising irregular grid datasets. Example embodiments described herein includes a DSP having a self-learning/self-trainable feature that may be optimized over time by training the DSP using known graph data fed into the DSP. After an optimized DSP is generated, parameters of the optimized DSP may be stored in a database for later retrieval to facilitate automated predictions in an online (or a prediction) phase using unknown graph data.

In one example embodiment, an apparatus is provided for generating and training a digital signal processor (DSP) to evaluate graph data. The apparatus includes at least one processor and at least on memory including computer program code, wherein the at least one memory and the computer program code configured to, with the at least one processor, cause the apparatus to receive, by a processor, known graph data that includes irregular grid graph data, and split, by the processor, the known graph data into a set of training graph data and a set of cross-validation graph data. The at least one memory and the computer program code are further configured to, with the at least one processor, cause the apparatus to construct, by the processor, a set of filters using the training graph data, and formulate, by the processor, an objective function for training. The at least one memory and the computer program code are further configured to, with the at least one processor, cause the apparatus to generate, by the processor, an optimized DSP using the objective function, the constructed set of filters, the training graph data and the cross-validation graph data, wherein the optimized DSP includes a set of hidden layers, wherein each hidden layer of the set of hidden layers comprises a set of heterogeneous kernels (HKs), and wherein each HK of the set of HKs includes a corresponding set of filters selected from the constructed set of filters and associated with one or more initial Laplacian operators and corresponding initial filter parameters, and save, in a memory, a set of parameters defining the optimized DSP.

In another example embodiment, a method is provided for generating and training a digital signal processor (DSP) to evaluate graph data. The method includes receiving, by a processor, known graph data that includes irregular grid graph data, and splitting, by the processor, the known graph data into a set of training graph data and a set of cross-validation graph data. The method further includes constructing, by the processor, a set of filters using the training graph data, and formulating, by the processor, an objective function for training. The method further includes generating, by the processor, an optimized DSP using the objective function, the constructed set of filters, the training graph data, and the cross-validation graph data, wherein the optimized DSP includes a set of hidden layers, wherein each hidden layer of the set of hidden layers comprises a set of heterogeneous kernels (HKs), and wherein each HK of the set of HKs includes a corresponding set of filters selected from the constructed set of filters and associated with one or more initial Laplacian operators and corresponding initial filter parameters and saving, in a memory, a set of parameters defining the optimized DSP.

In yet another example embodiment, an apparatus is provided for generating a predicted result using graph data and a DSP. The apparatus includes at least one processor and at least on memory including computer program code, wherein the at least one memory and the computer program code are configured to, with the at least one processor, cause the apparatus to receive, by a processor, unknown graph data that includes irregular grid graph data. The at least one memory and the computer program code are configured to, with the at least one processor, further cause the apparatus to retrieve an optimized DSP, wherein the optimized DSP includes a set of hidden layers, wherein each hidden layer of the set of hidden layers comprises a set of heterogeneous kernels (HKs), and wherein each HK of the set of HKs includes a corresponding set of filters selected from the constructed set of filters and associated with one or more initial Laplacian operators and corresponding initial filter parameters. In addition, the at least one memory and the computer program code are configured to, with the at least one processor, further cause the apparatus to generate, by the processor and using the optimized DSP, a predicted result based on the unknown graph data.

In another example embodiment, a method is provided for generating a predicted result using graph data and a DSP. The method includes receiving, by a processor, unknown graph data that includes irregular grid graph data, and retrieving an optimized DSP, wherein the optimized DSP includes a set of hidden layers, wherein each hidden layer of the set of hidden layers comprises a set of heterogeneous kernels (HKs), and wherein each HK of the set of HKs includes a corresponding set of filters selected from the constructed set of filters and associated with one or more initial Laplacian operators and corresponding initial filter parameters. The method also includes generating, by the processor and using the optimized DSP, a predicted result based on the unknown graph data.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWINGS

Figure 1:
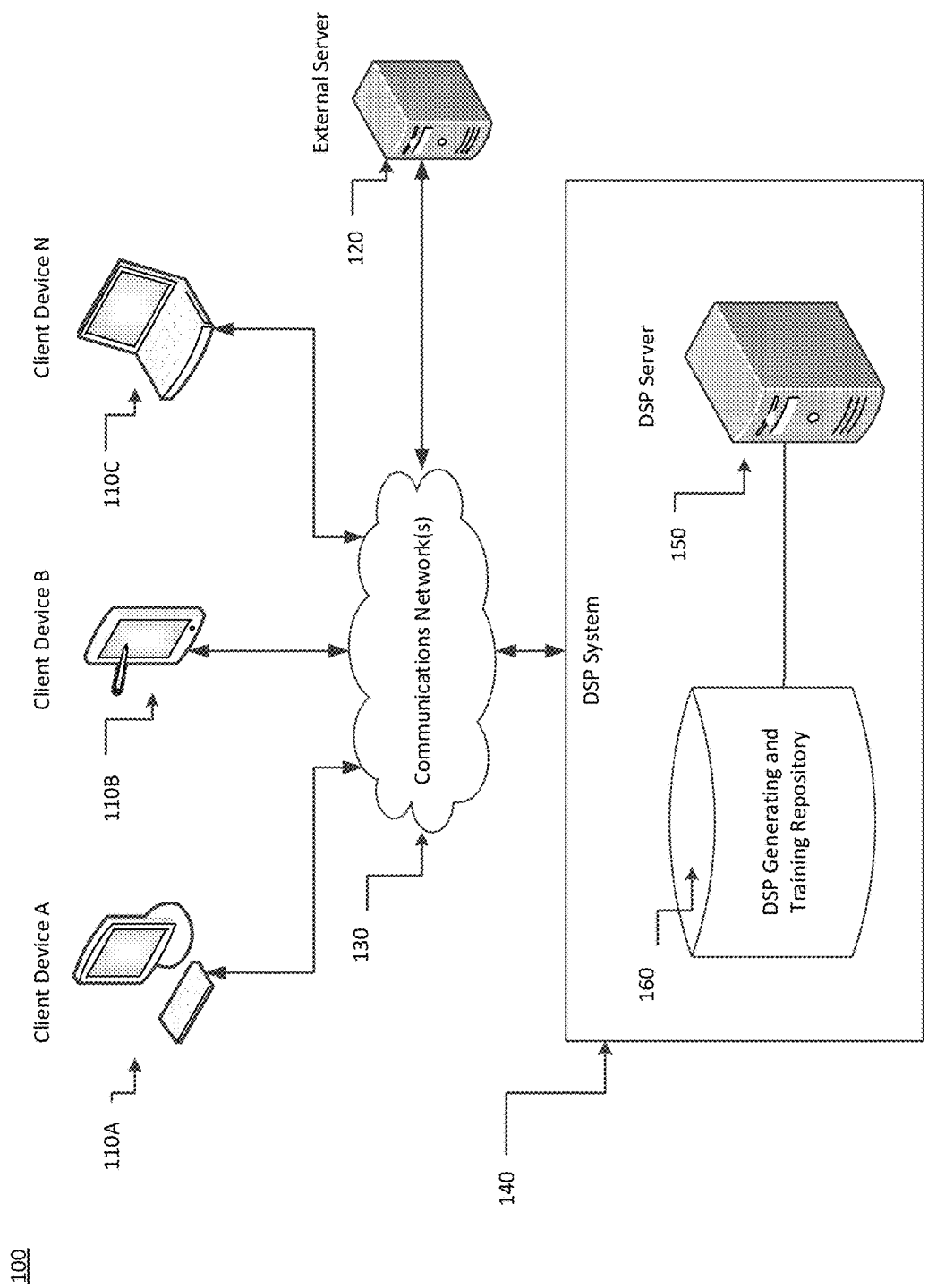
Figure 2:
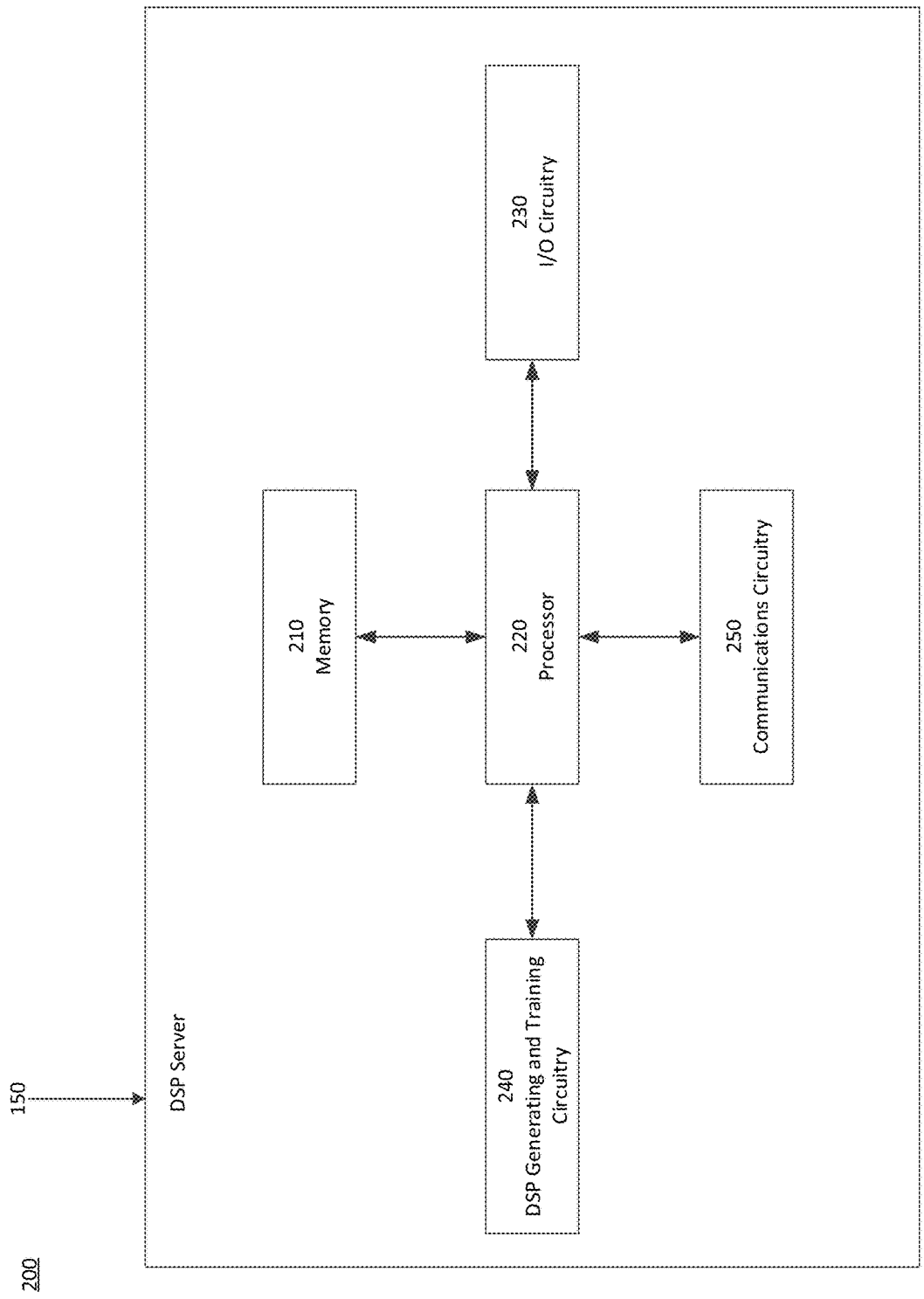
Figure 3:
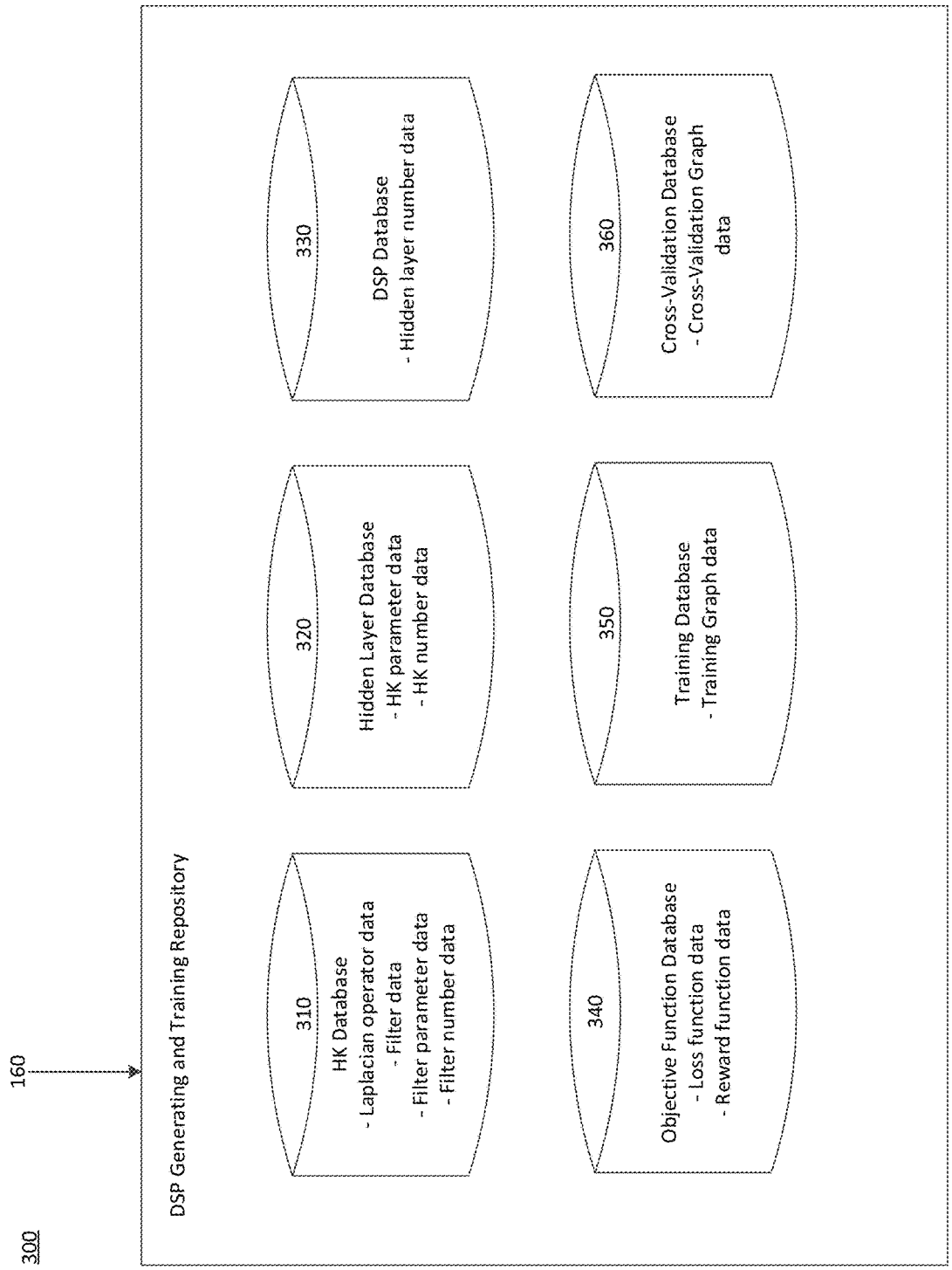
Figure 4C:
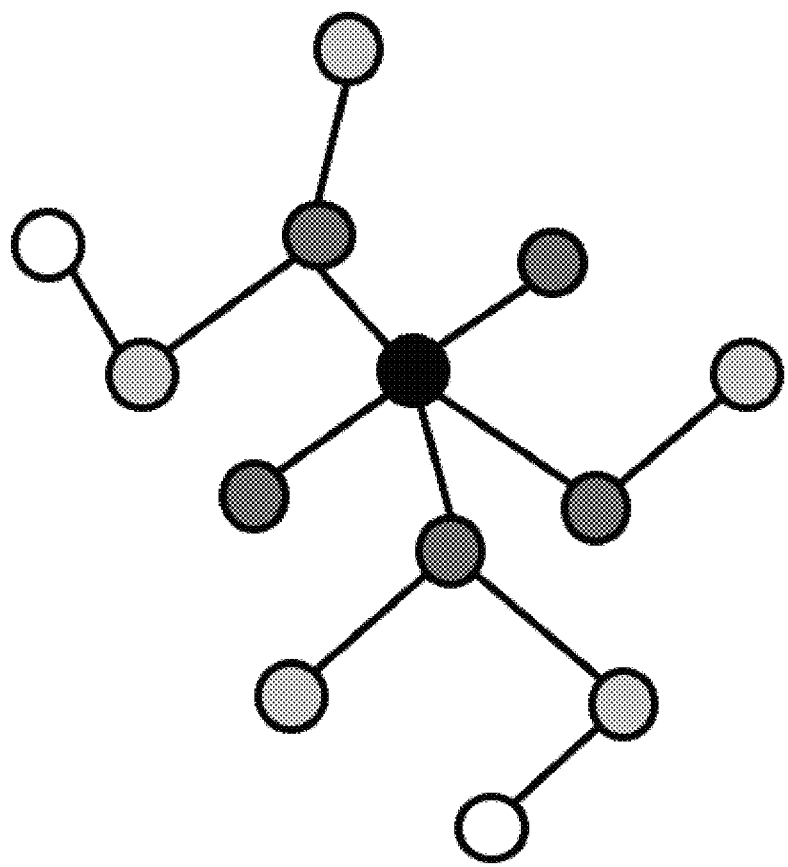
Figure 5:
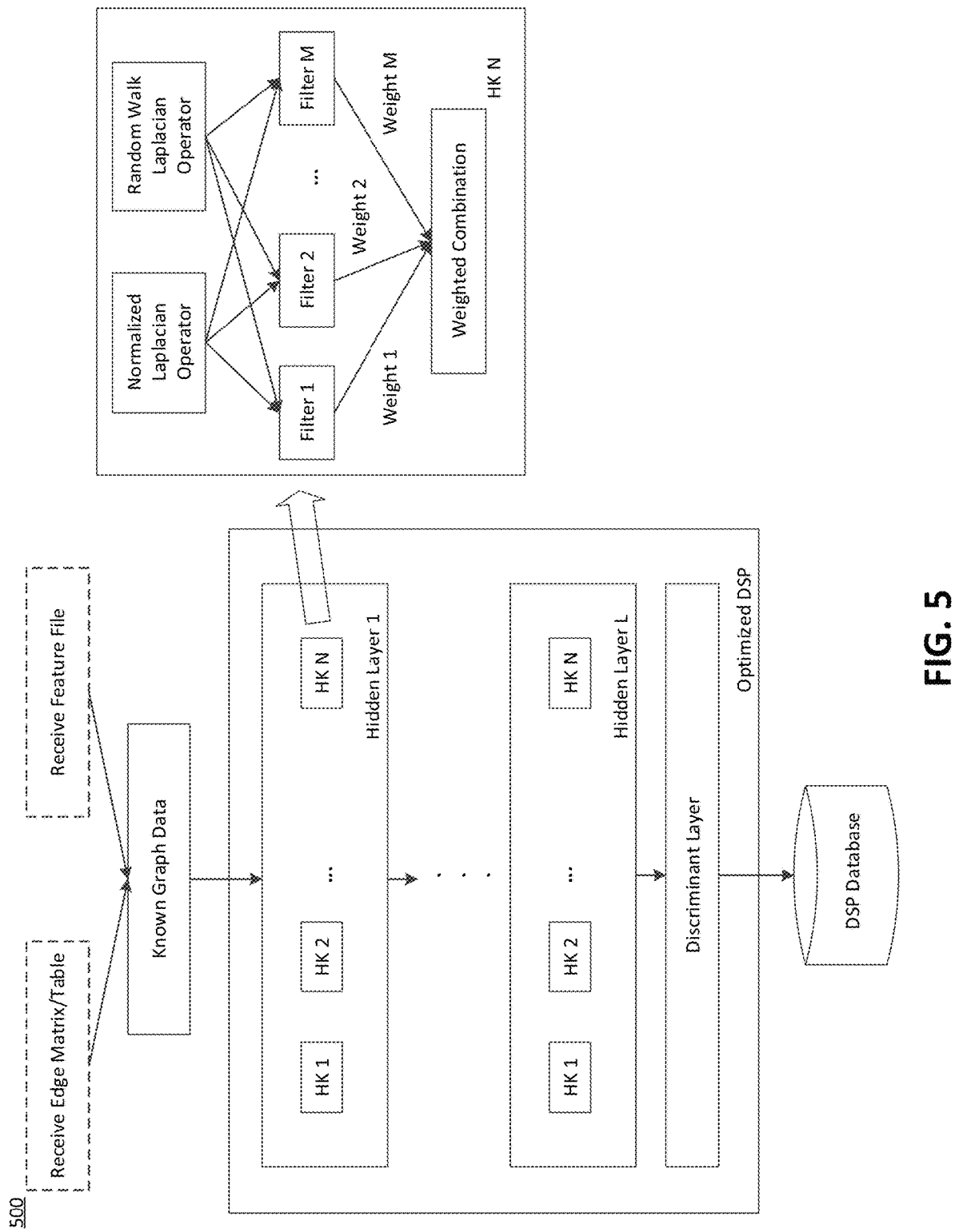
Figure 6:
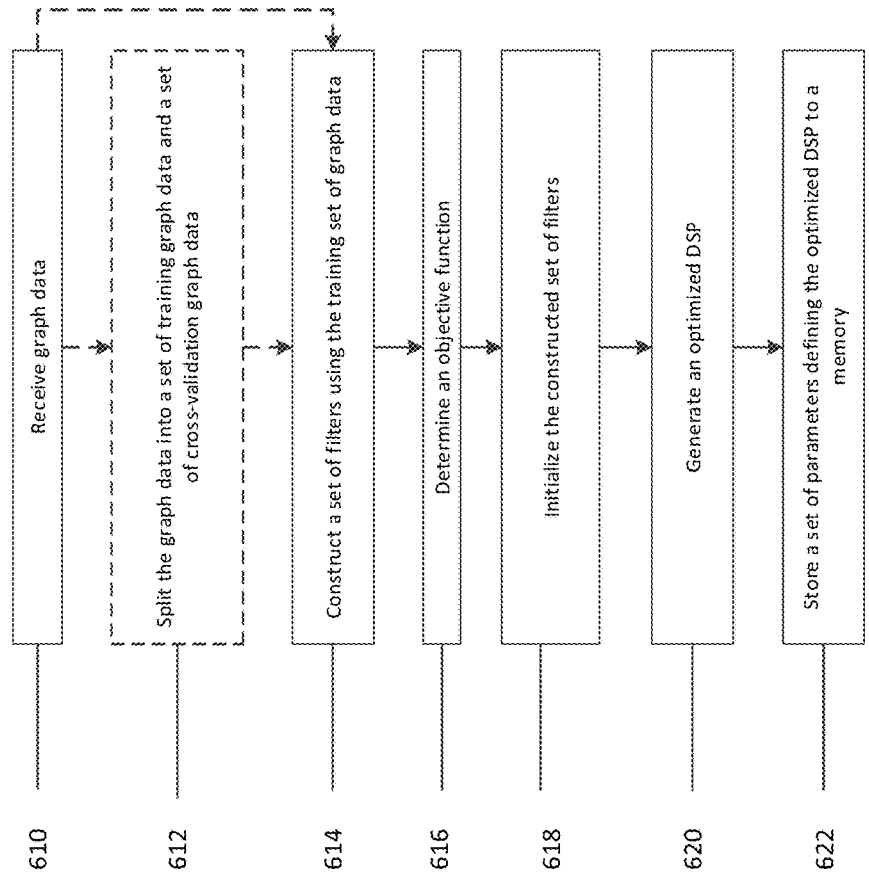
Figure 7:
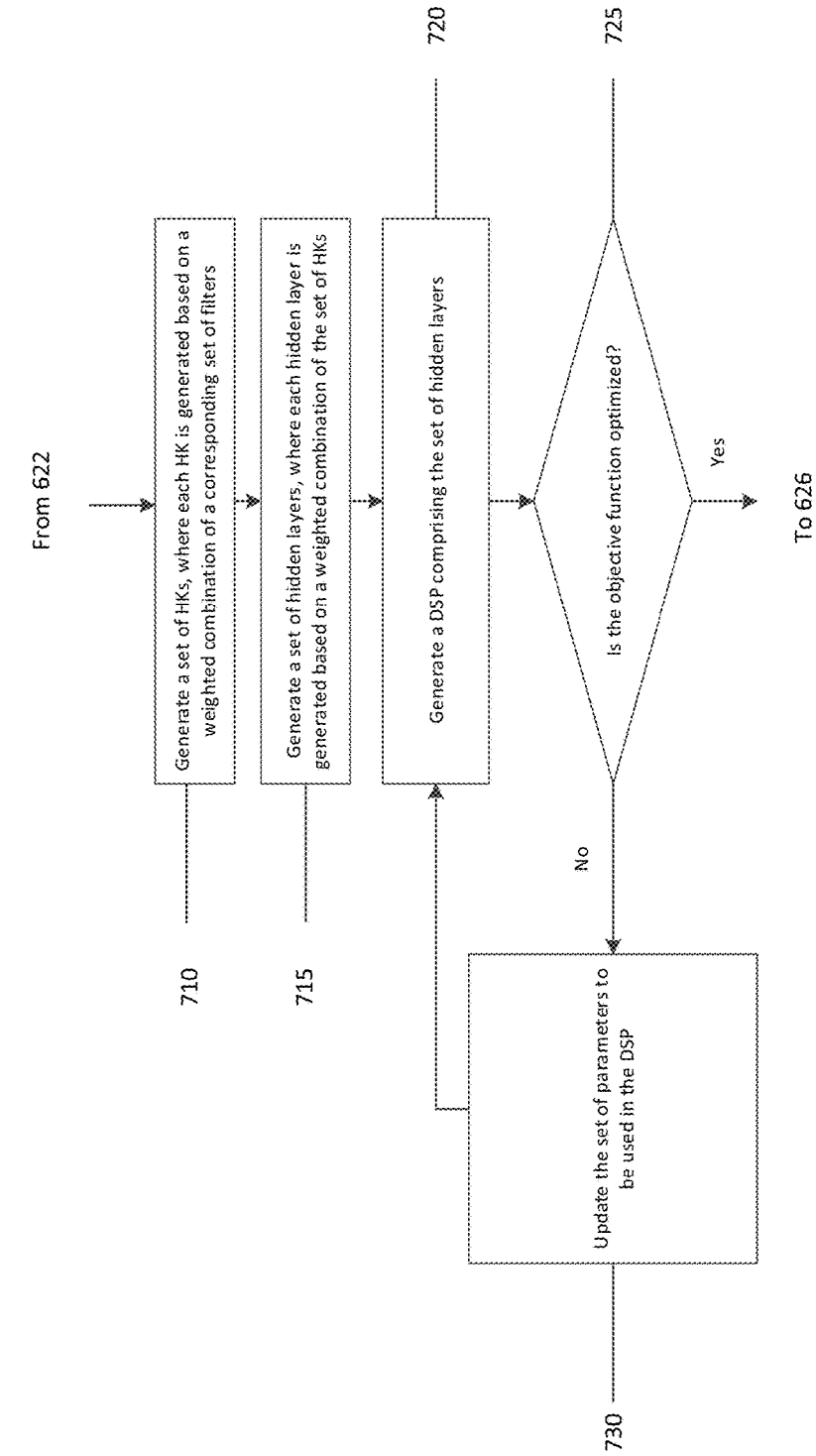
Figure 8:
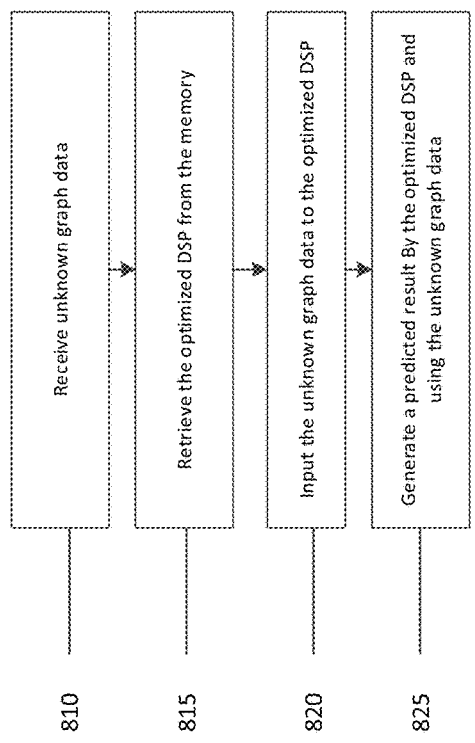

Having thus described the invention in general terms, reference will now be made to the accompanying drawings, which are not necessarily drawn to scale, and wherein:

FIG. 1 is a diagram of a system that can be used in conjunction with various embodiments of the present invention;

FIG. 2 is a schematic of a computing entity in accordance with certain embodiments of the present invention;

FIG. 3 is a schematic of a memory media storing a plurality of repositories, databases, and/or relational tables;

FIGS. 4A and 4B illustrate exemplary regular graph data that may be evaluated in accordance with example embodiments described herein;

FIG. 4C illustrates an example of irregular graph data that may be evaluated in accordance with example embodiments described herein;

FIG. 5 illustrates an exemplary DSP structure generated according to one embodiment of the present disclosure;

FIG. 6 illustrates an exemplary flow diagram for generating and training a DSP according to one embodiment of the present disclosure;

FIG. 7 illustrates an exemplary flow diagram for generating an optimized DSP in an iterative manner; and FIG. 8 illustrates an exemplary flow diagram for generating a predicted result for graph data using an optimized DSP according to one embodiment of the present disclosure.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. EXEMPLARY TERMS

As used herein, the terms "data," "dataset," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "client device," "computing entity," "system," may refer to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and/or the like.

The term "user" should be understood to refer to an individual, group of individuals, business, organization, and/or the like.

As used herein, the term "machine-learning model" refers to a computing system storing a set of algorithms that has been optimized through the implementation of a training process rather than through manual modification. In this regard, the training process may involve providing the set of algorithms with training data, which contains a set of records each having particular inputs and corresponding outputs comprising the correct "answer" for the inputs. The training process may be an iterative process providing the inputs for a particular record to the set of algorithms and determining whether the output of the set of algorithms corresponds to the known output for the particular record. If so, then no changes are made to the set of algorithms. If not, however, then the training process involves autonomously altering the set of algorithms, providing the inputs for the particular record to the set of algorithms again, and determining again whether the output of the set of algorithms corresponds to the known output for the particular record. This process may be iterated until the set of algorithms produces an output that corresponds to the known output for the particular record. The training process iterates through each record in the training data either a predetermined number of times or until an optimized version of the set of algorithms produces outputs for the records in the training data mirroring the known outputs for those records. The resulting machine-learning model is considered "trained" insofar as it is expected to produce accurate predictions of outputs for new data for which the correct output is unknown. As used herein, a machine-learning model may be used to predict relationships between nodes of irregular grid graph data. More specifically, a machine learning model may be a component of a digital signal processor (DSP) configured to analyze the irregular graph data. In the present disclosure, a known/seen graph dataset is used as a training dataset for training the DSP. The trained DSP may further be used to receive an unknown/unseen graph dataset and output a prediction regarding nodes of the unknown/unseen dataset.

The term "digital signal processor (DSP)" historically refers to a special-purpose processor designed for efficient use in signal processing and other applications requiring efficient execution of complex mathematical operations. In the context of embodiments disclosed herein, the term "digital signal processor" or "DSP" may encompass such processing devices, but more broadly refers to any computing systems implementing machine learning to analyze graph datasets. In this context, a DSP may host an artificial neural network structure comprising multiple hidden layers (such as those described below) each comprising multiple heterogeneous kernels (such as those described below). Some example DSPs have learnable features that may be trained by feeding the DSP known/seen dataset as input. The trained DSP may be used later to draw predictions regarding unknown/unseen data.

As used herein, the terms "irregular grid dataset," "irregular grid graph data," and the like, refer to graph data having an irregular grid structure. An irregular grid graph dataset comprises a set of nodes connected by a set of edges structured such that any pair of nodes may or may not be connected (with arbitrary weights/distances) in Euclidean space. Irregular grid graph data comprises a subset of all graph data. As described herein, social networks, the world-wide-web, protein-interaction networks, telecommunication networks, knowledge graphs, or any of a number of other types of real-world systems may be represented using irregular grid graph data. However, graph data encompasses more than just irregular grid data. Graph data may also comprise regular grid data, which is a special case of graph data for which nodes have regular connectivities. Similar to CNNs, example embodiments of the DSP described herein work with regular grid data, however unlike CNNs, these example embodiments also work with irregular grid data.

As used herein, the term "hidden layer" refers to an element within a DSP whose output comprises an input to another element within the DSP rather than an output of the DSP itself. In the context of embodiments disclosed herein, a DSP may comprise a plurality of connected hidden layer. In this context, the DSP may process the received input dataset in a layer-by-layer manner.

As used herein, the term "heterogeneous kernel (HK)" refers to a component of a given hidden layer of a DSP. In this regard, a given hidden layer may comprise one or a plurality of HKs. Each HK comprises an aggregated set of filters comprising one or more of a K-order Chebyshev filter, a first-order renormalized filter, a K-order topology adaptive filter, or any other suitable filter. The mathematical representations of a set of exemplary filters are presented in the following table:

| | |
|---|---|
| $\sum_{K=1}^{k=0} \theta_k T_k(\tilde{\Lambda})$ | K-order Chebyshev filter |
| $\theta(\tilde{D}^{-1/2}\tilde{A}\tilde{D}^{-1/2})$ | $1^{st}$-order renormalized filter |
| $\sum_{K=1}^{k=0} \theta_k \tilde{A}^k$ | K-order topology adaptive filter | where $\theta_k$ represents the k-th polynomial coefficient parametrizing the filter and optimized for during the training, $T_k(\bullet)$ represents the k-th order matrix Chebyshev polynomial, $\tilde{\Lambda}$ represents rescaled frequency $\tilde{\Lambda} \in [-1, 1]$, A represents an adjacency matrix of the graph, $\tilde{A}=A+I$ is the adjacency matrix with self-connection (the identity matrix 1), and D represents a diagonal matrix with diagonal element $D_{ii}=\Sigma_j A_{ij}$. In this context, a given HK may be constructed by a weighted combination of different filters listed in the above table, as illustrated below:

$$y = \sum_{m=0}^{M-1} \alpha_m \hat{g}_\theta^{(m)}(L)x,$$

$$\hat{g}_\theta^{(m)}(L) \in \left\{ \sum_{K=1}^{k=0} \theta_k T_k(\tilde{\Lambda}), \theta\left(\tilde{D}^{-1/2}\tilde{A}\tilde{D}^{-1/2}, \sum_{K=1}^{k=0} \theta_k \tilde{A}^k \ldots \text{etc}\right)\right\},$$

where x represents input dataset, y represents output dataset, M represents a total number of filters selected in the model, and $\alpha_m$ represents a learnable parameter associated with the m-th filter $\hat{g}_\theta^{(m)}(L)$ that is associated with the corresponding Laplacian operator $L_m$ and is selected from a filter set comprising a K-order Chebyshev filter, a first-order renormalized filter, and a K-order topology adaptive filter.

As used herein, the term "Laplacian operator" refers to a derivative filter that is used to find locations of rapid changes or edges in the graph data. In the context of embodiments disclosed herein, a filter within an HK may be constructed based on different Laplacian operators, such as a normalized Laplacian operator or a random walk Laplacian operator. In this context, the normalized Laplacian operator may be denoted as:

$$L=D^{-1/2}L_cD^{-1/2}=I_N-D^{-1/2}AD^{-1/2},$$

and the random walk Laplacian operator may be denoted as:

$$L=D_{-1}L_c=I_N-D^{-1}A,$$

where A represents an adjacency matrix of the graph, D represents a diagonal matrix with diagonal element $D_{ii}=\Sigma_j A_{ij}$, $L_c=D-A$, and $I_N$ represents an N-by-N identity matrix.

As used herein, the term "objective function" refers to a targeting function or a targeting goal that a machine learning model is desired to optimize. An objective function may be a "loss function" representing some cost associated with one or more variables that the optimization problem seeks to minimize by way of modification to the designed machine learning model. An objective function may also be a "reward function" representing some profit associated with one or more variables that the optimization problem seeks to maximize by way of the designed machine learning model.

As used herein, the term "training dataset" refers to dataset that is used to optimize or train parameters of a machine learning model. In the context of machine learning, a machine learning is trained on the training dataset comprising pairs of an input data and the corresponding answer data or target data. The machine learning model is used to run with input data and produce a predictive result, which is then compared with the target data. Based on the result of the comparison and the designed learning algorithm being used, the parameters of the machine learning model are adjusted and updated for optimizing predictive results.

As used herein, the term "cross-validation dataset" refers to a dataset that is used to validate the predictive accuracy of a machine learning model trained using the training dataset. A cross-validation dataset may be used to prevent overfitting to the training dataset by stopping the training process when the predictive accuracy of the machine learning model diminishes when tested on the validation dataset.

II. GENERAL OVERVIEW

Artificial intelligence has been used for analyzing problems, such as image classification, video recognition, and text classification in a variety of contexts. More specifically, different types of machine learning solutions have been used for these purposes. For example, for problems that may be modeled by regular grid datasets having a feature of constant Euclidean distance and local stationary structures, a convolutional neural network (CNN) model may provide accurate predictive results. However, for those problems that may only be modeled by irregular grids, a traditional CNN model is not be able to provide accurate predictive results.

Embodiments described herein set forth DSP machine learning models for use with graph data, including that comprising irregular grid datasets. Example embodiments described herein includes a DSP having a self-learning/self-trainable feature that may be optimized over time by training the DSP using known graph data fed into the DSP. The DSP comprises a series of cascaded hidden layers, where each hidden layer comprises a weighted combination of HKs, and each HK in turn comprises a weighted combination of filters. The DSP included in example embodiments described here can be trained in an offline phase using known data in order to optimize an objective function in an iterative manner. After an optimized DSP is generated, parameters of the optimized DSP may be stored in a database for later retrieval to facilitate automated predictions in an online (or a prediction) phase using unknown graph data.

Example DSPs disclosed herein may be optimized by modifying the different filters comprising any given HK, by using different numbers of HK for each hidden layer, and by using different numbers of hidden layers. Through this manner of implementation, example embodiments described herein may generate predictive results with better accuracy than traditionally used CNN models.

a. Technical Problem to be Solved

Machine learning method has been used to resolve machine learning problems associated with digital signals that may be modeled by regular grid graph data. For regular grid graph data, historical DSP modeling tools have been had reasonable success due to the local stationarity of the grid. However, for irregular grid data, traditional CNN models have not been able to generate accurate predictive result.

Example DSPs disclosed herein overcome this technical hurdle for implementing machine learning methods on irregular grid data. More specifically, example embodiments may be used to resolve machine learning problems associated with real-world problems that are best modeled as irregular grids. One example of such a problem may be fraud detection, where an entity may wish to example a network of industry participants to identify which are potentially engaging in fraudulent activity. Another example may be modeling a series of providers and members in connection with a recommendation engine problem to identify improved ways to identifying whether to recommend providers to any given member within the network. Another exemplary problem may be disease prediction, where an irregular grid can be used to predict the spread of disease throughout a network. Another exemplary problem may be provider optimization, where an irregular grid can be used to predict an optimized providers for providing service to members within the network. In other words, example embodiments described herein provide technical solutions to problems that have historically been intractable. While the above examples are provided by way of illustration, they are intended as non-limiting examples, and other machine learning problems best modeled using irregular grid graphs may also be addressed using example embodiments described herein.

b. Technical Solution

As described above, not all data can be modeled using regular grids. For example, some real world data—such as social networks, telecommunication networks, point clouds, and/or the like—may only suitably be represented using irregular grids. Further, because application of kernel-based convolutions to irregular grids has not historically been feasible due to the fact that irregular grid data does not have local stationarity and compositionality, historical tools are not well suited to analysis of this data.

Example embodiments described herein address those problems using a neural network designed to apply deep learning on any type of graph data, including irregular grid data. Such example embodiments include a learnable structure comprising a plurality of different filters (rather than using a static arrangement of filters or simply a single type of filter) considered simultaneously in every iteration step of the training phase. Example embodiments described herein include a DSP having the feature of selecting a weighted combination of filters to form an HK, selecting a weighted combination of HKs to form a hidden layer, cascading a plurality of hidden layers, and self-generating an optimized DSP at the same time by optimizing an objection function.

As illustrated by the following table, the DSPs included in example embodiments described herein may have a better predictive result in terms of classification accuracy (in percent). From the below table, one example DSP generated in the manner disclosed herein (and denoted by "Proposed HK-GCN" in the first row) has a higher classification accuracy while having a lower complexity (or lower number of filters being used in the model) than historical tools. More specifically, three open source irregular grid datasets are used (e.g., Citeseer, Cora, and Pubmed) for comparing the efficacy of this example DSP to other CNN models (e.g., Kipf-GCN model, ChebNet model, DeepWalk model, and node2vic model). The comparison shows that the Proposed HK-GCN DSP produces a 71.2% accuracy for Citeseer dataset, 83.4% accuracy for Cora dataset, 79.4 accuracy for Pubmed dataset, and for each data set, the Proposed HK-GCN DSP provides the highest classification accuracy of all the models evaluated. Further, the Proposed HK-GCN DSP has less computational complexity in that it comprised 8 filters for the Citeseer dataset, 10 filters for the Cora dataset, and 6 filters for the Pubmed dataset after the objective function was optimized, demonstrating that fewer filters were required for forming Proposed HK-GCN DSP than for traditional CNN models.

| Methods | Citeseer | Cora | Pubmed |
| --- | --- | --- | --- |
| Proposed HK-GCN | 71.2 (8 filters) | 83.4 (10 filters) | 79.4 (16 filters) |
| Kipf-GCN [Kipf2017] | 70.3 (16 filters) | 81.5 (16 filters) | 79.0 (16 filters) |
| ChebNet [Defferrard2016] | 69.6 (16 filters) | 81.2 (16 filters) | 74.4 (16 filters) |
| DeepWalk [Perozzi2014] | 43.2 | 67.2 | 65.3 |
| node2vec [Grover2016] | 54.7 | 74.9 | 75.3 | c. Exemplary Use Contexts

The disclosed technical solution may be used to resolve and implement machine learning solutions on real-world representations of networks modeled by irregular grid graph data.

As a non-limiting example, irregular grid graph data may represent a fraud detection network comprising a set of nodes and a set of edges, where each node represents a provider or a member and each edge connecting two nodes represents a relationship between the two nodes. For example, an edge connecting an insurance provider and a member may represent that the member has an insurance policy from the insurance provider. This relationship may, in turn, affect the likelihood that the insurance provider and the member are involved in related activity, such that if one of the two is involved in fraudulent activity, there is a chance that the other may be as well. In this context, the known/seen graph data contains, for each of the providers and members included therein, data relevant to determining whether a given provider or member is or has been involved in fraudulent activity. Thus, when unknown/unseen graph data is presented to the machine-learning model, the machine-learning model identifies combinations of situations represented in the known/seen graph data that are representative of likely fraudulent activity, such that the system can thereafter predict whether providers or members represented by unknown/unseen graph data are likely also involved in fraudulent activity (specifically, the system generates a result indicative of the level of similarity between nodes in the known/seen graph data associated with fraudulent activity and nodes in the unknown/unseen graph data). Following verification of the fraudulent (or non-fraudulent) nature of the activities performed by each provider or member represented in the unknown/unseen graph data, the unknown/unseen graph data may be used to further train the machine-learning model for increased accuracy of future analyses.

As another non-limiting example, irregular grid graph data may alternatively represent a recommendation engine network comprising a set of nodes and a set of edges, where each node represents a provider or a member and each edge connecting two nodes represents a relationship between the two nodes. For example, an edge connecting a provider and a member may indicate that the member has purchased a product from the provider, and this relationship may be indicative of relevant characteristics connecting providers and members that can inform future search inquiries.

As yet another non-limiting example, irregular grid graph data may represent a life sciences network (such as a disease prediction network) as a set of nodes and a set of edges, where each node represents a disease or a patient and each edge connecting two nodes represents a relationship between the patient and the disease. For example, an edge connecting a disease and a patient may indicate a patient has a disease, and various attributes of the disease and the patient may be indicative of whether a similarly situated patient would be likely to contract the disease. In this context, the known/seen graph data contains, for each of the diseases and patients included therein, valuable information indicative of the spread of the disease.

And as yet another non-limiting example, irregular grid graph data may represent a provider optimization network using a set of nodes and a set of edges, where each node represents a provider or a member and each edge connecting two nodes represents a relationship between the two nodes. For example, an edge connecting a health care provider and a member may indicate that a provider has treated the member, and of the various providers and members connected in this fashion, some of the treatments were more effective than others. In this context, when trained using a set of known/seen graph data identifying the connections between providers and members and the success of the various treatments, training of the DSP may enable the DSP to identify information indicative of a likelihood that unknown members would be cured by the treatment provided by unknown health care providers.

The above exemplary neural network problems are presented as non-limiting examples, and other machine learning problems (e.g., various social network problems) modeled as irregular grid graph data can also be addressed using example DSPs described herein.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 provides an illustration of a system 100 that can be used in conjunction with various embodiments of the present invention. As shown in FIG. 1, the system 100 may comprise one or more client devices 110A-110C, one or more user external server 120, one or more communications networks 130, a DSP system 140, and/or the like. Each of the components of the system may be in electronic communication with, for example, one another over the same or different wireless or wired communications networks 130. For example, users may access the DSP system 140 via communications networks 130 using client devices 110A-110C. An external server 120 may interact with the DSP system 140 via communications networks 130. Additionally, the DSP system 140 may comprise a DSP server 150 in communication with at least one DSP generating and training repository 160. While FIG. 1 illustrate certain system entities as separate, standalone entities, the various embodiments are not limited to this particular architecture.

The client devices 110A-110C may be any computing device as defined above. Electronic data received by the DSP server 150 from the client devices 110A-110C may be provided in various forms and via various methods. For example, the client devices 110A-110C may include desktop computers, laptop computers, smartphones, netbooks, tablet computers, wearables, and the like.

The external server 120 may be embodied as a computer or computers as known in the art. The external server 120 is configured to provide graph data to the DSP system via communications networks 130. The external server operates on a compiled code base or repository that is separate and distinct from that which supports the DSP system. In some embodiments, the external server may communicate with the DSP system, and vice versa, through one or more external application program interfaces (APIs). In some embodiments, the external server receives tokens or other authentication credentials that are used to facilitate secure communication between the external server and the DSP system in view of DSP system network security layers or protocols (e.g., network firewall protocols). Once connected with the remote networked device, the external server may transmit graph data through the DSP system for generating and training a DSP or generating predictive results based on an existing trained DSP.

Communications network(s) 130 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network(s) 130 may include a cellular network, an 802.11, 802.16, 802.20, and/or WiMax network. Further, the communications network(s) 130 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the DSP system. In some embodiments, the protocol is a custom protocol of JSON objects sent via a Websocket channel. In some embodiments, the protocol is JSON over RPC, JSON over REST/HTTP, and the like.

The DSP server 150 may be embodied as a computer or computers as known in the art. The DSP server 150 may provide for receiving of electronic data from various sources, including but not necessarily limited to the client devices 110A-110C or external server 120. For example, the DSP server 150 may be operable to receive known/seen graph data provided by client devices 110A-110C or external server 120, for generating, training, and optimizing a DSP. For another example, the DSP server 150 may be operable to receive unknown/unseen graph data provided by client devices 110A-110C or external server 120, to generate a predictive result associated with the unknown/unseen graph data based on the optimized DSP.

The DSP generating and training repository 160 may be embodied as a data storage device such as a Network Attached Storage (NAS) device or devices, or as a separate database server or servers. The DSP generating and training repository 160 includes information accessed and stored by the DSP server 150 to facilitate the operations of the DSP system 140. For example, the DSP generating and training repository 160 may include, without limitation, a plurality of databases storing parameters associated with each hidden layer, HK, filter, Laplacian operator, and/or the like for constructing a DSP.

a. Exemplary Analytic Computing Entity

FIG. 2 provides a schematic of a DSP server 150 that may be embodied by one or more computing entities according to one embodiment of the present invention. In general, the terms computing entity, entity, device, system, and/or similar words used herein interchangeably may refer to, for example, one or more computers, computing entities, desktop computers, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the DSP server 150 may include a processor 220, a memory 210, input/output circuitry 230, communications circuitry 250, and a DSP generating and training circuitry 240. The DSP server 150 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the DSP server 150 may provide or supplement the functionality of particular circuitry. For example, the processor 220 may provide processing functionality, the memory 210 may provide storage functionality, the communications circuitry 250 may provide network interface functionality, and the like.

In some embodiments, the processor 220 (and/or co-processor or any other processing circuitry assisting or otherwise associated with the processor) may be in communication with the memory 210 via a bus for passing information among components of the apparatus. The memory 210 may be non-transitory and may include, for example, one or more volatile and/or non-volatile memories. In other words, for example, the memory may be an electronic storage device (e.g., a computer readable storage medium). The memory 210 may be configured to store information, data, content, applications, instructions, or the like, for enabling the apparatus to carry out various functions in accordance with example embodiments of the present disclosure.

The processor 220 may be embodied in a number of different ways and may include one or more processing devices configured to perform independently. For example, the processor 220 may be embodied as one or more complex programmable logic devices (CPLDs), microprocessors, multi-core processors, coprocessing entities, application-specific instruction-set processors (ASIPs), and/or controllers. Further, the processor 220 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 220 may be configured to execute instructions stored in the memory 210 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the DSP server 150 may include input/output circuitry 230 that may, in turn, be in communication with processor 220 to provide output to the client devices and, in some embodiments, to receive an indication of a user input via the client devices. The input/output circuitry 230 may comprise a user interface and may include a display and may comprise a web user interface, a mobile application, a client device, a kiosk, or the like. In some embodiments, the input/output circuitry 230 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 210, and/or the like).

The communications circuitry 250 may be any means such as a device or circuitry embodied in either hardware or a combination of hardware and software that is configured to receive and/or transmit data from/to a network and/or any other device, circuitry, or module in communication with the DSP server 150. In this regard, the communications circuitry 250 may include, for example, a network interface for enabling communications with a wired or wireless communication network. For example, the communications circuitry 250 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The DSP generating and training circuitry 240 includes hardware configured to support a DSP system. The DSP generating and training circuitry 240 may utilize processing circuitry, such as the processor 220, to perform these actions. The DSP generating and training circuitry 240 may send and/or receive data from DSP generating and training repository 160. In some implementations, the sent and/or received data may be parameters associated with each hidden layer, HK, filter, Laplacian operator, and/or the like for constructing and training a DSP. It should also be appreciated that, in some embodiments, the DSP generating and training circuitry 240 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

As will be appreciated, one or more of the DSP server 150's components may be located remotely from other DSP system 140 components, such as in a distributed system. Furthermore, one or more of the components may be aggregated and additional components performing functions described herein may be included in the DSP system 140. Thus, the DSP system 140 can be adapted to accommodate a variety of needs and circumstances.

b. Exemplary User Computing Entity

FIG. 3 provides an illustrative schematic representative of the DSP generating and training repository 160 that can be used in conjunction with embodiments of the present invention. In one embodiment, the DSP system 140 may further include or be in communication with non-volatile media (also referred to as non-volatile storage, memory, memory storage, memory circuitry and/or similar terms used herein interchangeably). In one embodiment, the DSP generating and training repository 160 may include one or more non-volatile storage or memory media, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The terms "database," "database instance," "database management system entity," and/or similar terms used herein interchangeably may refer to a structured collection of records or information/data that is stored in a computer-readable storage medium, such as via a relational database, hierarchical database, and/or network database.

DSP generating and training repository 160 may also be embodied as a data storage device or devices, as a separate database server or servers, or as a combination of data storage devices and separate database servers. Further, in some embodiments, DSP generating and training repository 160 may be embodied as a distributed repository such that some of the stored data is stored centrally in a location within the system and other data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the data required for the operation of the system may be stored. As a person of ordinary skill in the art would recognize, the data required for the operation of the system may also be partially stored in the cloud data storage system and partially stored in a locally maintained data storage system.

DSP generating and training repository 160 may include information accessed and stored by the system to facilitate the operations of the system. More specifically, DSP generating and training repository 160 may encompass one or more data stores configured to store data usable in certain embodiments. For example, as shown in FIG. 3, databases encompassed within the DSP generating and training repository 160 may comprise an HK database 310, a hidden layer database 320, a DSP database 330, an objective function database 340, a training database 350, a cross-validation database 360, and/or the like.

As illustrated in FIG. 3, the HK database 310 may comprise Laplacian operator data including data associated with different Laplacian operators (e.g., a normalized Laplacian operator or a random walk Laplacian operator) for generating different filters constructing an HK. The HK database 310 may further comprise filter data including selected filters (e.g., a K-order Chebyshev filter, a first-order renormalized filter, or a K-order topology adaptive filter) for constructing each HK. The HK database 310 may further comprise filter parameter data for generating an HK comprising a weighted combination of filters, where each filter parameter is associated with a corresponding filter and served as a weighting value for generating the weighted combination of filters within an HK. The HK database 310 may further comprise filter number data that records a number of filters selected within each HK in the machine learning process for optimizing a DSP.

The hidden layer database 320 may comprise HK parameter data for generating a hidden layer, where each HK parameter is associated with a corresponding HK and served as a weighting value for generating a weighted combination of HKs within a hidden layer. The hidden layer database 320 may further comprise HK number data that records a number of HKs selected within each hidden layer in the machine learning process for optimizing a DSP.

The DSP database 330 may comprise hidden layer number data that records a number of hidden layers selected for cascading to generate and optimize a DSP in the machine learning process.

The objective function database 340 may comprise loss function data and reward function data provided for selection. In the machine learning context, a DSP may be optimized by minimizing a loss function based on the selected loss function data or by maximizing a reward function based on the selected reward function data.

The training database 350 may comprise training dataset provided for generating, training, and optimizing a DSP in a machine learning process. The cross-validation database 360 may comprise cross-validation dataset provided for evaluating predictive results of the optimized DSP and determining when to stop the optimization/training process to prevent overfitting the model. The training dataset and the cross-validation dataset may be generated based on splitting a known/seen graph data. A first portion of the known/seen graph data may be stored in the training database 350 and a second portion of the known/seen graph data may be stored in the cross-validation database 360.

In one embodiment, the DSP generating and training repository 160 may further include or be in communication with volatile media (also referred to as volatile storage, memory, memory storage, memory circuitry and/or similar terms used herein interchangeably). In one embodiment, the volatile storage or memory may also include one or more volatile storage or the DSP generating and training repository 160 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the DSP system 140 with the assistance of the processor 220 and operating system.

c. Exemplary Networks

In one embodiment, any two or more of the illustrative components of the architecture of FIG. 1 may be configured to communicate with one another via respective communicative couplings to one or more communications networks 130. The communications networks 130 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the communications networks 130 may have any suitable communication range associated therewith and may include, for example, global networks (e.g., the Internet), MANs, WANs, LANs, or PANs. In addition, the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. EXEMPLARY SYSTEM OPERATION

Reference will now be made to FIGS. 4A-8. FIGS. 4A and 4B illustrate exemplary regular grid datasets received for conducting digital signal processing using machine learning. As shown in FIG. 4A, an image data may be sampled and formulated as two-dimensional (2D) grid data, where the Euclidean distance between adjacent sample points (shown as circle points in FIG. 4A) is constant. Similarly, as shown in FIG. 4B, audio data may be sampled and formulated as one-dimensional (1D) grid data having a constant Euclidean distance between adjacent sample points. When using machine learning to resolve problems that may be modeled as regular grid data, such as image classification, video recognition, and text classification, predictive results with better accuracy may be received due to the local stationarity of regular grid data. However, some type of problems may not be modeled as regular grid data. Example DSPs in accordance with embodiments of the present disclosure may be used to solve machine learning problems in circumstances where those problems can only be modeled as irregular grid data.

FIG. 4C, in contrast, illustrates an exemplary irregular grid graph received for conducting digital signal processing using machine learning. As shown in FIG. 4C, the irregular grid graph data (which, as noted above, may represent a number of different real-world scenarios, such as a fraud detection network, a recommendation engine network, a life science network (e.g., a disease prediction network), and/or a provider optimization network) comprises a set of nodes and a set of edges, where each edge connects two adjacent nodes. The irregular grid graph data may not only capture features associated with the nodes, but may also capture features associated with the edges having different Euclidean distances representing a corresponding relationship between any two nodes.

As will be recognized, irregular grid graph data may represent a variety of other embodiments. For example, irregular grid graph data may represent social networks, telecommunications networks, point clouds, computer networks, protein-interaction networks, knowledge graphs, and/or the like.

FIG. 5 illustrates an exemplary DSP structure generated according to one embodiment of the present disclosure. As shown in FIG. 5, when a DSP system receives known graph data. In some embodiments, the known graph data may be derived from an edge/matrix table and a feature file received by the DSP. To systematically describe the data structure of the known graph data, one may denote the graphset as G=(V,E,A), where V denotes the set of vertices (i.e., nodes), E is the set of edges, and A is the weighted adjacency matrix of the graph. Assuming there are L nodes in V the set of vertices can be represented as V=[$v_1$, . . . , $v_L$]. Assuming there are T features associated with each node, the feature matrix, denoted by X, will have dimension L×T. This feature matrix X may be directly loaded from a feature file received by the DSP as set forth above. The weighted adjacency matrix A is derived from an edge matrix/table that defines pairwise connection and weight between any two nodes, and that is also received by the DSP, as set forth above. An example transformation from edge matrix/table to adjacency matrix is shown below in Table 1.

TABLE 1

| Edge matrix/table | | | Adjacency matrix | | | | |
|---|---|---|---|---|---|---|---|
| From node | To node | Weight | | Node 1 | Node 2 | Node 3 | Node 4 |
| Node 1 | Node 2 | 0.8 | Node 1 | | 0.8 | | 0.1 |
| Node 1 | Node 4 | 0.1 | Node 2 | 0.8 | | 0.6 | 0.3 |
| Node 2 | Node 3 | 0.6 | Node 3 | | 0.6 | | 0.7 |
| Node 2 | Node 4 | 0.3 | Node 4 | 0.1 | 0.3 | 0.7 | |
| Node 3 | Node 4 | 0.7 | | | | | |

One can observe that A is a L×L sparse matrix so that it can be horizontally stacked with X, i.e., [X, A], which may thereafter comprise the known graph data comprising the input to the DSP. The known graph data may then be fed into a DSP generating and training model for generating an optimized DSP. Once the DSP is optimized, the parameters of the optimized DSP (e.g., the number of hidden layers, the number of HKs within each hidden layer, and the underlying makeup of each HK within each hidden layer) may then be stored into the DSP database subsequent utilization.

FIG. 5 further illustrates an exemplary DSP structure proposed for implementing machine learning on irregular grid graph data. The disclosed DSP includes a plurality of hidden layers (as denoted by "Hidden Layer 1," . . . , to "Hidden Layer L") that are cascaded one layer after another. Each hidden layer may include a weighted combination of a plurality of HKs (as denoted by "HK 1," "HK 2," . . . , to "HK N"). Each HK may further include a weighted combination of a plurality of filters (as denoted by "Filter 1," "Filter 2," . . . , to "Filter M"), where each filter may be generated based on different Laplacian operators as illustrated in FIG. 5. The disclosed DSP may have a special structure utilizing different Laplacian operators for generating different filters, which provides prediction results with better accuracy by considering different filters at the same time in the optimization process. The exemplary DSP structure may further include a discriminant layer which applies discriminant function analysis to find a linear combination of features that characterizes or separates two or more groups of data, as illustrated in FIG. 5.

FIG. 6 is a flowchart illustrating operations and processes that may be performed by a DSP system 140 for generating and training a DSP using known irregular grid graph data. As noted previously, the DSP system 140 may be embodied by a DSP server 150, which in turn comprises one or more of a processor 220, memory 210, I/O circuitry 230, communications circuitry 250, and DSP generating and training circuitry 240. At operation 610, the DSP sever 150 includes means, such as processor 220 or the like, for receiving graph data (which may comprise irregular grid graph data, regular grid graph data, or a combination of the two).

As shown at operation 612, the DSP server 150 may further includes means, such as processor 220, DSP generating and training circuitry 240, or the like, for splitting the graph data into a training set of graph data and a cross-validation set of graph data. In this regard, the training dataset may be used for generating an optimized DSP model, while the cross-validation dataset is thereafter used to ensure that an optimized DSP model has predictive value and/or to determine when to stop iterative training in order to prevent overfitting of the model. Operation 612 is described herein as optional, and when cross-validation is deemed unnecessary, the entirety of the known graph data may serve as the training dataset, in which case the procedure may advance from operation 610 above directly to operation 614 below. In one example embodiment, this cross-validation operation adopts exhaustive search, which may help to generate an optimal heterogenous kernel. However, a heterogenous kernel can be also generated from random selection without cross-validation (which may not be optimal). Moreover, for some tasks, cross-validation is not required where the problem domain is amenable to overfitting the whole dataset.

The method 600 continues at operation 614, in which the DSP server 150 further includes means, such as processor 220, DSP generating and training circuitry 240, or the like, for constructing a set of filters using the training set of graph data. The set of filters may include one or more of a K-order Chebyshev filter, a first-order renormalized filter, or a K-order topology adaptive filter, although yet other filters may be used in other embodiments. The following provides a methodology for constructing graph filters according to some embodiments. First, as noted above, an adjacency matrix A is derived as explained previously. Thereafter, the adjacency matrix A is substituted into the equations of Laplacian operator L to calculate both normalized and random-walk Laplacian. As noted previously, the graph filters are the functions of Laplacian operators. In some embodiments, it is important to enumerate both normalized and random-walk Laplacians for all graph filters with different hyperparameters in the cross-validation phase. To this end, any known graph filters can be used here. For ease of explanation, the following is a comprehensive list of all possible heterogeneous kernels using only two known filters: (a) 1-order Chebyshev filter with random-walk Laplacian & first-order renormalized filter with random-walk Laplacian (this filter has no other hyperparameters); (b) 2-order Chebyshev filter with random-walk Laplacian & first-order renormalized filter with random-walk Laplacian; (c) 3-order Chebyshev filter with random-walk Laplacian & first-order renormalized filter with random-walk Laplacian; (d) 1-order Chebyshev filter with random-walk Laplacian & first-order renormalized filter with normalized Laplacian; (e) 2-order Chebyshev filter with random-walk Laplacian & first-order renormalized filter with normalized Laplacian; (f) 3-order Chebyshev filter with random-walk Laplacian & first-order renormalized filter with normalized Laplacian; (g) 1-order Chebyshev filter with normalized Laplacian & first-order renormalized filter with random-walk Laplacian; (h) 2-order Chebyshev filter with normalized Laplacian & first-order renormalized filter with random-walk Laplacian; (i) 3-order Chebyshev filter with normalized Laplacian and order-3, first-order renormalized filter with random-walk Laplacian; (j) 1-order Chebyshev filter with normalized Laplacian & first-order renormalized filter with normalized Laplacian; (k) 2-order Chebyshev filter with normalized Laplacian & first-order renormalized filter with normalized Laplacian;

(1) 3-order Chebyshev filter with normalized Laplacian and order-3, first-order renormalized filter with normalized Laplacian.

Using cross-validation helps to enumerate all possible weighted combination of these graph filters and hence select the optimal set, which may then be used as the heterogeneous kernel. This heterogeneous kernel mathematically has much larger receptive fields than any of prior arts and hence has superior performance in our experiment. On the other hand, the weighted combination of graph filter enhances the generalization of the model, which may be analogized to ensemble methods in the conventional machine learning. The filter set may be preexisting in the DSP, such that individual filters are programmed into functions and then simply retrieved from a memory/local disks by the DSP as appropriate. For instance, when training data comes in, the DESP server 150 may use these functions to generate the designed heterogenous kernel.

As shown at operation 616, the DSP server 150 further includes means, such as processor 220, DSP generating and training circuitry 240, or the like, for determining an objective function for optimizing a DSP model. In some embodiments, the objective function may be a loss function or a reward function. The objective function may be selected and served as a targeting goal for optimizing the DSP model. The objective function can be modelled as objective function=metric(ground truth, predicted result), where metric(ground truth, predicted result) is the function which measures the difference/similarity between ground truth and predicted results, e.g., mean squared error (MSE), mean absolute error (MAE), categorical crossentropy, binary crossentropy, Kullback-Leibler divergence, or the like. In some embodiments, categorical cross entropy may be selected for multiclass classification tasks, binary crossentropy may be selected for binary classification tasks, and MSE/MAE may be selected for regression tasks. Moreover, the optimization (minimization/maximization) of the objective function may occur through the gradient descent method or its variants.

As shown at operation 618, the DSP server 150 further includes means, such as processor 220, DSP generating and training circuitry 240, or the like, for initializing the constructed filters. In this regard, initializing the constructed filters may include selecting initial weights for each constructed filter as a whole as well as for various parameters of each filter.

As shown at operation 620, the DSP server 150 further includes means, such as processor 220, DSP generating and training circuitry 240, or the like, for generating an optimized DSP using the objective function determined at operation 616, the set of filters constructed at operation 614, and the training set of graph data and the cross-validation set of graph data split at operation 612. Example sub-steps for generating the optimized DSP at operation 620 are described in greater detail in connection with FIG. 7.

As shown at operation 622, the DSP server 150 further includes means, such as processor 220, communications circuitry 240, or the like, for storing the parameters defining the optimized DSP in a memory (such as memory 210). The parameters defining the optimized DSP may comprise a set of data enabling a system (e.g., DSP system 140) to subsequently re-create the optimized DSP. For instance, the parameters defining the optimized DSP may include information defining the discriminant function of the optimized DSP as well as the number of hidden layers in the optimized DSP, and the number and structure of each HK in each of the hidden layers of the optimized DSP.

As noted above, following operation 618 in FIG. 6, the procedure of FIG. 6 advances to operation 620. One set of example sub-steps that may be performed at operation 620 are described as follows in connection with FIG. 7, which sets forth a flowchart illustrating a more detailed sequence of operations and processes that may be performed by a DSP system 140 for generating an optimized DSP in an iterative manner. As noted previously in FIG. 6, the DSP system 140 may be embodied by a DSP server 150, which in turn comprises one or more of a processor 220, memory 210, I/O circuitry 230, communications circuitry 250, and DSP generating and training circuitry 240. DSP server 150 further includes means, such as processor 220 or the like, for generating a set of heterogeneous kernels (HKs). In this regard, each particular HK may be generated based on a weighted combination of a corresponding set of filters selected from the constructed set of filters constructed in the manner outlined above in 614. As described in connection with FIG. 5, each HK may comprise a corresponding set of filters associated with one or more initial Laplacian operators and initial filter parameters. The HK may further be associated with an initial filter number representing a total number of filters in the corresponding set of filters. Each filter may further be associated with an initial filter parameter indicating a weighting value used in the weighted combination of the HK.

As shown at operation 715, the DSP server 150 further includes means, such as processor 220 or the like, for generating a set of hidden layers, where each hidden layer is generated based on a weighted combination of a set of HKs, each HK of the set of HKs is associated with an initial HK parameter, and wherein each hidden layer is associated with an initial HK number indicating how many HKs are being selected to form each hidden layer. In embodiments, a hidden layer may be initialized based on an initial weighted combination of a set of HKs. The "weight" of each HK comprises an initial HK parameter serving as baseline parameter in the iterative machine learning process that may be modified iteratively during the iterative set of operations shown in FIG. 7.

As shown at operation 720, the DSP server 150 further includes means, such as processor 220 or the like, for generating an initial DSP comprising a set of hidden layers. The initial DSP further comprises a discriminant layer that provides discriminant function analysis on output produced by the set of hidden layers. For example, the discriminant layer may formulate a softmax function for multiclass classification, a sigmoid furcation for binary classification, and linear activation for regression. For instance, the output of the softmax function may be used to represent a categorical probability distribution regarding one target feature over all possible features (e.g., features associated with nodes and edges of the graph data). For another example, the discriminant layer may formulate a linear activation function to solve a regression problem associated with the graph data. Furthermore, the sigmoid function may be used to classify output data produced by the set of hidden layers in a non-linear and binary way.

As shown at operation 725, the DSP server 150 further includes means, such as processor 220 or the like, for determining whether the objective function selected in step 616 is optimized. To this end, an empirical step in deep learning to understand the convergence of the optimization of objective function is to observe the learning curve: after the improvement in first several epochs, if the performance metric on cross-validation set approaches constant stability in the following several epochs, the objective function may be assumed to be converged to optimal (or local optimal). In circumstances where the objective function is determined to be not optimized, the method 700 continues at operation 730. If the objective function is optimized, however, the method advances to operation 620 as described in FIG. 6.

As shown at operation 730, the DSP server 150 further includes means, such as processor 220 or the like, for updating the one or more initial Laplacian operators, the corresponding initial filter parameters, the initial filter number, the initial 1-1K parameter, the initial 1-1K number, and/or the initial hidden layer number associated with the initial DSP, and returning back to operation 725 to evaluate whether the updated version of the initial DSP is optimized. This iterative loop between operations 725 and 730 may be repeated until the objective function is optimized. At operation 725, any of the different Laplacian operators, filters, HKs, hidden layers and their associated parameters may be modified as part of this iterative optimization process. Thus, the disclosed DSP included in example embodiments described herein may provide a predictive results with great precision based on the disclosed machine learning process. To this end, the cross-validation dataset may be used to observe the validation performance after each epoch training is finished. In a neural network domain, 'one epoch' is when an ENTIRE dataset is passed forward and backward through the neural network only ONCE. And to train a neural network model, several epochs are usually needed. However, it is usually not possible to pass an entire dataset into the neural network at once due to hardware constraints, so there is often a need to divide a dataset into a number of mini-batches. Then, the number of 'iterations' needed to complete each epoch is the number of mini-batches needed to pass the entire dataset into the neural network. In this fashion, the size of entire dataset (for 1 epoch of training) is equal to the mini-batch size times the number of iterations. Table 2 provides a simple illustration of observing cross-validation results:

As can be seen in Table 2, each 'step' refers to each iteration in one epoch. The cross-validation data set is used to measure to validation performance (val_loss) when each epoch training is finished. And in turn, there may be several epochs needed for training purposes (in the example shown in Table 2, there are 10 epochs). A special case is where the mini-batch size is equal to the size of entire data set, in which case one epoch of training will have only one iteration, so that the cross-validation dataset is used when each iteration is completed.

FIG. 8 illustrates an exemplary flow diagram for generating a predicted result from unknown graph data based on an optimized DSP according to one embodiment of the present disclosure. As with FIGS. 6-7, the operations illustrated in FIG. 8 may be performed by a DSP system 140. At operation 810, the DSP server 150 includes means, such as processor 220 or the like, for receiving unknown graph data. The unknown graph data may represent new/unknown data for analysis by an optimized DSP that is trained to generate a prediction regarding the domain of the unknown graph data.

At operation 815, the DSP server 150 includes means, such as processor 220, memory 210, communications circuitry 250, I/O circuitry 230, or the like, for retrieving the optimized DSP. In some embodiments, an optimized DSP is at this point generated in the first instance based on the steps illustrated in FIGS. 6-7. In other embodiments where an optimized DSP has been previously generated, the parameters defining that previously generated DSP are retrieved from a memory and the optimized DSP is re-created based on those parameters. In yet other embodiments where an optimized DSP has been previously generated by the processor and still persists (e.g., where the optimized DSP already exists), the previously generated optimized DSP may simply be utilized. In any event, as shown by operation 820, the DSP server 150 includes means, such as processor 220 or the like, for inputting the unknown graph data to the optimized DSP. As shown at operation 825, the DSP server

TABLE 2

Epoch 1/10

715442/715442 [==============================] - 1456 s 2 ms/step - loss: 0.0011 - val_loss: 8.4992e−04

Epoch 2/10

715442/715442 [==============================] - 1539 s 2 ms/step - loss: 8.0923e−04 - val_loss: 7.7575e−04

Epoch 3/10

715442/715442 [==============================] - 1535 s 2 ms/step - loss: 7.6253e−04 - val_loss: 7.4941e−04

Epoch 4/10

715442/715442 [==============================] - 1548 s 2 ms/step - loss: 7.3277e−04 - val_loss: 7.2124e−04

Epoch 5/10

715442/715442 [==============================] - 1531 s 2 ms/step - loss: 7.0766e−04 - val_loss: 6.9653e−04

Epoch 6/10

715442/715442 [==============================] - 1547 s 2 ms/step - loss: 6.8720e−04 - val_loss: 7.2790e−04

Epoch 7/10

715442/715442 [==============================] - 1544 s 2 ms/step - loss: 6.7326e−04 - val_loss: 6.7583e−04

Epoch 8/10

715442/715442 [==============================] - 1539 s 2 ms/step - loss: 6.6213e−04 - val_loss: 6.6043e−04

Epoch 9/10

715442/715442 [==============================] - 1550 s 2 ms/step - loss: 6.5229e−04 - val_loss: 6.5040e−04

Epoch 10/10

715442/715442 [==============================] - 1544 s 2 ms/step - loss: 6.4986e−04 - val_loss: 6.4477e−04

150 includes means, such as processor 220 or the like, for generating, using the optimized DSP, a predicted result based on the inputted unknown graph data. In some embodiments, this predicted result is generated by inputting the unknown graph data into the optimized DSP, such that the output from the optimized DSP comprises the predicted result. Based on the output produced by the optimized DSP, conclusions may be drawn regarding likely facts about the unknown graph data, and further analysis regarding the unknown graph data may be conducted.

Through the generation, training, and use of a DSP system 140 described herein, example embodiments provide new tools that facilitate accurate and useful predictive evaluation of data represented by irregular grid graph data. In turn, example embodiments thus unlock new predictive capabilities in a variety of domains, from improved fraud detection and enhanced recommendation engines to improved tools for evaluating the spread of disease, provider selection, or any of a number of other types of complicated real-world scenarios.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for generating and training a digital signal processor (DSP) to evaluate graph data, the apparatus comprising at least one processor and at least one memory including computer program code, wherein the at least one memory and the computer program code are configured to, with the at least one processor, cause the apparatus to:
  receive, by a processor, known graph data that includes irregular grid graph data;
  split, by the processor, the known graph data into a set of training graph data and a set of cross-validation graph data;
  construct, by the processor, a constructed set of filters using the set of training graph data, wherein: (i) each constructed filter in the set of constructed filters is generated based at least in part on a corresponding initial Laplacian operator of one or more initial Laplacian operators and a corresponding filter type of a set of filter types, and (ii) the set of filter types comprise a K-order Chebyshev filter type, a first order renormalized filter type, and a K-order topology adaptive filter type;
  formulate, by the processor, an objective function for training;
  generate, by the processor, an optimized DSP including a set of hidden layers, each comprising a set of heterogeneous kernels (HKs) using at least one of the objective function, the constructed set of filters, the set of training graph data, or the set of cross-validation graph data, by:
    generating, by the processor, the set of HKs, wherein each HK is associated with a corresponding set of filters that: (i) is selected from the constructed set of filters, and (ii) comprises at least one filter associated with the K-order Chebyshev filter type, at least one filter associated with the first order renormalized filter type, and at least one filter associated with the K-order topology adaptive filter type, wherein each HK of the set of HKs is generated based at least in part on a weighted combination of the corresponding set of filters associated with the HK and is associated with an initial filter number representing a total number of filters in the corresponding set of filters;
    generating, by the processor, the set of hidden layers, wherein each hidden layer of the set of hidden layers is generated based at least in part on a weighted combination of the set of HKs, wherein each HK of the set of HKs is associated with an initial HK parameter, and wherein each hidden layer is associated with an initial HK number representing a total number of HKs in each hidden layer;
    generating, by the processor, an initial DSP based at least in part on the set of hidden layers, wherein the initial DSP is associated with an initial hidden layer number representing a total number of hidden layers in the initial DSP; and
    updating, by the processor, the one or more initial Laplacian operators, one or more corresponding initial filter parameters, the initial filter number, the initial HK parameter, the initial HK number, and the initial hidden layer number associated with the initial DSP in an iterative manner using the set of training graph data and the set of cross-validation graph data until the objective function is optimized for defining the optimized DSP; and
  save, in a memory, a set of parameters defining the optimized DSP.

2. The apparatus of claim 1, wherein the set of parameters defining the optimized DSP includes the one or more corresponding initial filter parameters, the initial filter number, the initial HK parameter, the initial HK number, or the initial hidden layer number saved to the memory after the objective function is optimized.

3. The apparatus of claim 1, wherein each of the one or more initial Laplacian operators is a normalized Laplacian operator or a random walk Laplacian operator.

4. The apparatus of claim 1, wherein the optimized DSP further comprises a discriminant layer.

5. The apparatus of claim 1, wherein the objective function is a loss function or a reward function.

6. The apparatus of claim 5, wherein in circumstances where the objective function is the loss function, the objective function is optimized when the loss function is minimized.

7. The apparatus of claim 5, wherein in circumstances where the objective function is the reward function, the objective function is optimized when the reward function is maximized.

8. The apparatus of claim 1, wherein the one or more initial Laplacian operators comprise a normalized Laplacian operator and a random walk Laplacian operator.

9. The apparatus of claim 8, wherein each corresponding set of filters for a particular HK comprises at least one filter generated based at least in part on the normalized Laplacian operator and at least one filter generated based at least in part on the random walk Laplacian operator.

10. A method for generating and training a digital signal processor (DSP) to evaluate graph data, the method comprising:

receiving, by a processor, known graph data that includes irregular grid graph data;

splitting, by the processor, the known graph data into a set of training graph data and a set of cross-validation graph data;

constructing, by the processor, a constructed set of filters using the set of training graph data, wherein: (i) each constructed filter in the set of constructed filters is generated based at least in part on a corresponding initial Laplacian operator of one or more initial Laplacian operators and a corresponding filter type of a set of filter types, and (ii) the set of filter types comprise a K-order Chebyshev filter type, a first order renormalized filter type, and a K-order topology adaptive filter type;

formulating, by the processor, an objective function for training;

generating, by the processor, an optimized DSP including a set of hidden layers, each comprising a set of heterogeneous kernels (HKs) using at least one of the objective function, the constructed set of filters, the set of training graph data, or the set of cross-validation graph data, by:

generating, by the processor, the set of HKs, wherein each HK is associated with a corresponding set of filters that: (i) is selected from the constructed set of filters, and (ii) comprises at least one filter associated with the K-order Chebyshev filter type, at least one filter associated with the first order renormalized filter type, and at least one filter associated with the K-order topology adaptive filter type, wherein each HK of the set of HKs is generated based at least in part on a weighted combination of the corresponding set of filters associated with the HK and is associated with an initial filter number representing a total number of filters in the corresponding set of filters;

generating, by the processor, the set of hidden layers, wherein each hidden layer of the set of hidden layers is generated based at least in part on a weighted combination of the set of HKs, wherein each HK of the set of HKs is associated with an initial HK parameter, and wherein each hidden layer is associated with an initial HK number representing a total number of HKs in each hidden layer;

generating, by the processor, an initial DSP based at least in part on the set of hidden layers, wherein the initial DSP is associated with an initial hidden layer number representing a total number of hidden layers in the initial DSP; and updating, by the processor, the one or more initial Laplacian operators, one or more corresponding initial filter parameters, the initial filter number, the initial HK parameter, the initial HK number, and the initial hidden layer number associated with the initial DSP in an iterative manner using the set of training graph data and the set of cross-validation graph data until the objective function is optimized for defining the optimized DSP; and saving, in a memory, a set of parameters defining the optimized DSP.

11. The method of claim 10, wherein the set of parameters defining the optimized DSP includes the one or more corresponding initial filter parameters, the initial filter number, the initial HK parameter, the initial HK number, or the initial hidden layer number saved to the memory after the objective function is optimized.

12. The method of claim 10, wherein each of the one or more initial Laplacian operators is a normalized Laplacian operator or a random walk Laplacian operator.

13. The method of claim 10, wherein the optimized DSP further comprises a discriminant layer.

14. The method of claim 10, wherein the objective function is a loss function or a reward function.

15. The method of claim 14, wherein in circumstances where the objective function is the loss function, the objective function is optimized when the loss function is minimized.

16. The method of claim 14, wherein in circumstances where the objective function is the reward function, the objective function is optimized when the reward function is maximized.

17. A non-transitory computer readable medium for generating and training a digital signal processor (DSP) to evaluate graph data, the non-transitory computer readable medium comprising executable portions configured to:

receive, by a processor, known graph data that includes irregular grid graph data;

split, by the processor, the known graph data into a set of training graph data and a set of cross-validation graph data;

construct, by the processor, a constructed set of filters using the set of training graph data, wherein: (i) each constructed filter in the set of constructed filters is generated based at least in part on a corresponding initial Laplacian operator of one or more initial Laplacian operators and a corresponding filter type of a set of filter types, and (ii) the set of filter types comprise a K-order Chebyshev filter type, a first order renormalized filter type, and a K-order topology adaptive filter type;

formulate, by the processor, an objective function for training;

generate, by the processor, an optimized DSP including a set of hidden layers, each comprising a set of heterogeneous kernels (HKs) using at least one of the objective function, the constructed set of filters, the set of training graph data, or the set of cross-validation graph data, by:

generating, by the processor, the set of HKs, wherein each HK is associated with a corresponding set of filters that: (i) is selected from the constructed set of filters, and (ii) comprises at least one filter associated with the K-order Chebyshev filter type, at least one filter associated with the first order renormalized filter type, and at least one filter associated with the K-order topology adaptive filter type, wherein each HK of the set of HKs is generated based at least in part on a weighted combination of the corresponding set of filters associated with the HK and is associated with an initial filter number representing a total number of filters in the corresponding set of filters;

generating, by the processor, the set of hidden layers, wherein each hidden layer of the set of hidden layers is generated based at least in part on a weighted combination of the set of HKs, wherein each HK of the set of HKs is associated with an initial HK parameter, and wherein each hidden layer is associated with an initial HK number representing a total number of HKs in each hidden layer;

generating, by the processor, an initial DSP based at least in part on the set of hidden layers, wherein the initial DSP is associated with an initial hidden layer number representing a total number of hidden layers in the initial DSP; and updating, by the processor, the one or more initial Laplacian operators, one or more corresponding initial filter parameters, the initial filter number, the initial HK parameter, the initial HK number, and the initial hidden layer number associated with the initial DSP in an iterative manner using the set of training graph data and the set of cross-validation graph data until the objective function is optimized for defining the optimized DSP; and save, in a memory, a set of parameters defining the optimized DSP.

* * * * *